(No Model.)

H. W. SHEPARD.
APPARATUS FOR MAKING ALUMINA.

No. 488,580. Patented Dec. 27, 1892.

Witnesses:
Henry Drury
J. H. Russell

Inventor:
Henry Warren Shepard
by his atty.
Francis T. Chambers

UNITED STATES PATENT OFFICE.

HENRY WARREN SHEPARD, OF CAMDEN, NEW JERSEY, ASSIGNOR TO THE UNITED STATES CHEMICAL COMPANY, OF SAME PLACE, AND PHILADELPHIA, PENNSYLVANIA.

APPARATUS FOR MAKING ALUMINA.

SPECIFICATION forming part of Letters Patent No. 488,580, dated December 27, 1892.

Application filed March 3, 1892. Serial No. 423,589. (No model.)

*To all whom it may concern:*

Be it known that I, HENRY WARREN SHEPARD, of the city and county of Camden, State of New Jersey, have invented a certain new and useful Improvement in an Apparatus for Making Alumina, of which the following is a true and exact description, reference being had to the accompanying drawings, which form a part of this specification.

My invention relates to the construction of an apparatus for the treatment of aluminate of soda in the process of precipitating therefrom alumina.

The nature of my invention will be best understood as described in connection with the drawings in which it is illustrated, and in which—

Figure 1:
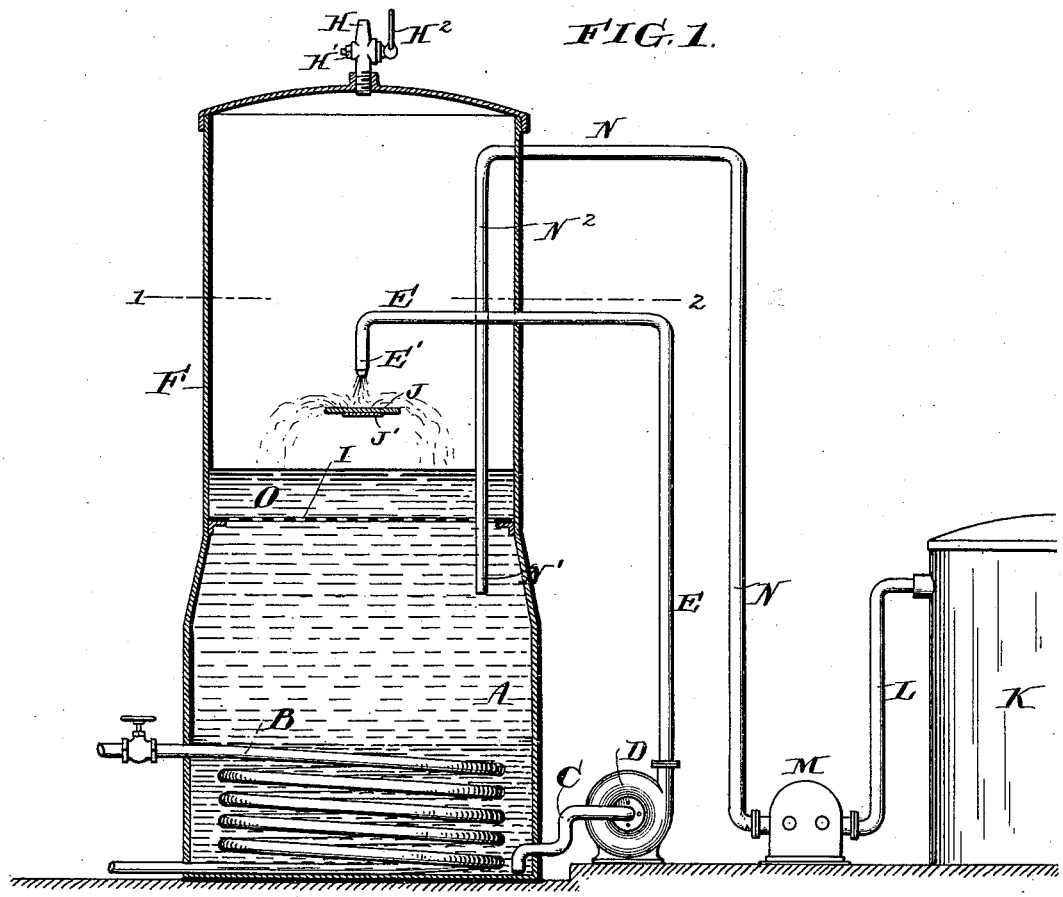
Figure 2:
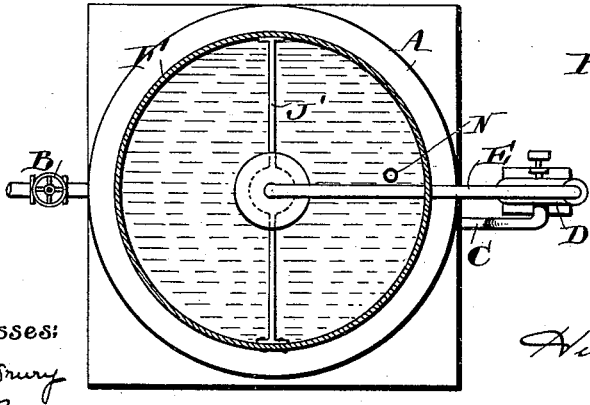

Figure 1 is an elevation of my apparatus partly in section, and—Fig. 2 a cross sectional view on the line 1—2 of Fig. 1.

A F is a tank adapted to contain aluminate of soda and provided with a steam heating coil B.

C E is a conduit leading from the lower to the upper part of the tank, the nozzle E' of which, as shown, points downward and is situated at a higher level than that of the fluid to be contained in tank F. The aluminate of soda liquor is pumped through conduit C E from the lower part A to the upper part F of the tank. From the upper part of the tank a regulated gas escape leads outward; as shown, it consists of a short pipe H having a regulating cock H' actuated by a handle H². Directly in front of the nozzle E' and above the level of the liquid O in the tank is a spray plate J sustained on a rod J'. In the tank and below the normal level of the liquid O is the perforated diaphragm I extending across the tank and secured to its sides as shown.

K is a receptacle or generator for carbonic acid gas from which leads the conduit L N which opens into the tank A F preferably at a point N' below the diaphragm I. Where the diaphragm is not used, or where from other reasons it is not desired to pass the carbonic acid gas into the liquid, the pipe N may be terminated at a higher point, as for instance, at N².

M is a blower or pump the function of which is to drive the carbonic acid gas into the tank under some degree of pressure.

In operation a clear strong solution of aluminate of soda is run into the tank and heated by means of the steam coil situated in said tank; the pump D is then set in operation causing the aluminate of soda liquor to flow through pipe C E with a considerable degree of velocity, and issuing from the nozzle E' it strikes against the spray plate J from which it is thrown off in a finely divided, or spray like condition; while the aluminate of soda is thus being fed to the tank, carbonic acid gas is passing from the receptacle K through pipes L N into the tank preferably being carried down below the diaphragm I, so that it will not only bubble up through the liquor, but will be spread about and distributed by the diaphragm I with the effect of giving all parts of the liquor about the same exposure to the gas. The spraying of the liquor by the device already described has, of course, also the effect of increasing the exposure of the aluminate of soda to the action of the carbonic acid gas. The gas is permitted to escape from the upper part of the tank through the pipe H, the valve H' of which is set so as to afford a certain amount of resistance insuring a uniform pressure greater than that of the atmosphere in the tank.

The chemical effect of the treatment described is familiar; the carbonic acid gas uniting with the alkali of the aluminate of soda forms carbonate of soda which remains in solution while the alumina liberated from its combination with the soda is precipitated as alumina—and after a given quantity of liquor has been exposed to treatment for a sufficient length of time it is pumped out of the tank A and a separation of the alumina from the carbonate of soda is effected by filters or in any convenient way.

Having now described my invention, what I claim as new and desire to secure by Letters Patent is—

1. The combination of a tank A. F. with a conduit C E leading from the lower part of the tank A to the upper part F said conduit having a delivery nozzle E' situated above the level of the fluid in the tank, a pump D arranged to force liquid through conduit C. E., a spraying device as J situated in the tank and acting to spray fluid from nozzle E′, a gas receptacle K, a pipe L N leading therefrom to tank F and a regulated gas escape H leading from tank F.

2. The combination of a tank A F with a conduit C E leading from the lower to the upper part thereof said conduit having a delivery nozzle E′ situated above the level of the fluid in the tank, a pump D arranged to force liquid through conduit C E, a spraying device as plate J situated in the tank in front of nozzle E′, a gas receptacle K, a pipe L N leading therefrom to the tank, a pump or blower M arranged to force gas through conduit L N, and a regulated gas escape H leading from the tank.

3. The combination of a tank A F with a conduit C E leading from the lower to the upper part thereof, said conduit having a delivery nozzle E′ situated above the level of the fluid in the tank, and a spraying device arranged to break up and spray the liquid issuing therefrom, a steam coil B situated in the bottom of the tank, a gas conduit N leading into the tank, and a regulated gas escape leading therefrom, substantially as and for the purpose specified.

4. The combination of a tank A F with a conduit C E leading from the lower to the upper part thereof said conduit having a delivery nozzle E′ situated above the level of the fluid in the tank and a spraying device arranged to break up and spray the liquid issuing therefrom, a perforated diaphragm situated in the tank below the fluid level, a gas conduit N leading into the tank and opening below the diaphragm, and a regulated gas escape H leading from the tank and serving to maintain the gas therein above atmospheric pressure.

HENRY WARREN SHEPARD.

Witnesses:
 JOSHUA E. BORTON,
 HARRY F. ERTEL.